United States Patent [19]
Hodlewsky et al.

[11] Patent Number: 4,809,846
[45] Date of Patent: * Mar. 7, 1989

[54] CHAIN LINK FOR A PRODUCT CAPTURING CHAIN

[75] Inventors: Wasyly G. Hodlewsky, Greendale; Roger H. Schroeder, Delafield, both of Wis.

[73] Assignee: Rexnord Corporation, Milwaukee, Wis.

[*] Notice: The portion of the term of this patent subsequent to Dec. 16, 2003 has been disclaimed.

[21] Appl. No.: 925,033

[22] Filed: Oct. 30, 1986

Related U.S. Application Data

[63] Continuation-in-part of Ser. No. 614,003, May 25, 1984, Pat. No. 4,629,063.

[51] Int. Cl.⁴ .............................................. B65G 17/06
[52] U.S. Cl. ................................... 198/853; 198/626; 198/690.2
[58] Field of Search ............... 198/853, 698, 699, 620, 198/690.2, 604, 626, 628, 803.01

[56] References Cited

U.S. PATENT DOCUMENTS

| | | | |
|---|---|---|---|
| 2,297,296 | 9/1942 | Flintjer | 198/626 |
| 2,734,621 | 2/1956 | Mojonnier | 198/628 |
| 3,513,964 | 5/1970 | Imse | 198/840 X |
| 3,741,744 | 6/1973 | Bowman | 198/620 X |
| 4,096,943 | 6/1978 | Gentsch | 198/851 X |
| 4,629,063 | 12/1986 | Hodlewsky et al. | 198/626 X |

FOREIGN PATENT DOCUMENTS

| | | | |
|---|---|---|---|
| 213046 | 1/1961 | Austria | 198/628 |
| 2451331 | 11/1980 | France | 198/853 |

*Primary Examiner*—Robert J. Spar
*Assistant Examiner*—Cheryl L. Gastineau
*Attorney, Agent, or Firm*—Michael, Best & Friedrich

[57] ABSTRACT

A chain link for a product capturing chain, including a pair of opposed retaining lips for retaining the resilient gripping member.

4 Claims, 4 Drawing Sheets

CHAIN LINK FOR A PRODUCT CAPTURING CHAIN

This application is a continuation-in-part of Ser. No. 614,003, filed May 25, 1984, now U.S. Pat. No. 4,629,063.

BACKGROUND OF THE INVENTION

This invention relates to conveyor chain and, more particularly, to an improved conveyor chain for use in a product capturing conveyor.

Product capturing chains have been used in the past for elevating articles from one level to another in a conveyor system. These chains are made up of a roller base chain with a snap-on metal top plate having a resilient attachment. Two strands of chain are run parallel to each other so that the resilient attachments oppose each other, picking up articles in their path by squeezing the articles between two opposing resilient attachments. The chains are able to flex in order to raise or lower the articles being conveyed, and then the two strands of chain separate, depositing the articles on a platform or conveyor at a different level.

The present invention improves on those chains in several respects. The product capturing chains of the prior art included several different pieces—a roller chain, a snap-on top plate, and a resilient attachment. They were difficult and expensive to assemble due to the number of pieces and the method by which the attachments were held on the chain. The top plate included two welded-on studs, which were inserted into holes in the resilient attachment to retain the attachment. Welding was an expensive operation on each link, and, of course, the existence of welds provided on a place for the assembly to fail. Also, the heat of welding might tend to distort the flight, so it would not run true on the supporting track. Welding also reduced the corrosion resistance of the parts. The holes in the resilient attachment provided a place for fatigue failure to begin as the attachment repeatedly flexed, picking up and releasing articles.

SUMMARY OF THE INVENTION

The purpose of the present invention is to provide an improved product capturing chain which has fewer pieces and is simpler and less expensive to manufacture and assemble than product capturing chains of the prior art. The present invention also provides a more reliable chain, because it eliminates welds on the top plate and holes in the resilient member, both of which might be sources of failure. In addition, the present invention is designed so as to provide smooth surfaces in contact with the resilient attachment member in order to avoid tearing or cutting that member, and it provides a design which is superior in reacting to any side thrust which might be exerted on the resilient member.

DESCRIPTION OF THE PREFERRED EMBODIMENT

Figure 2:
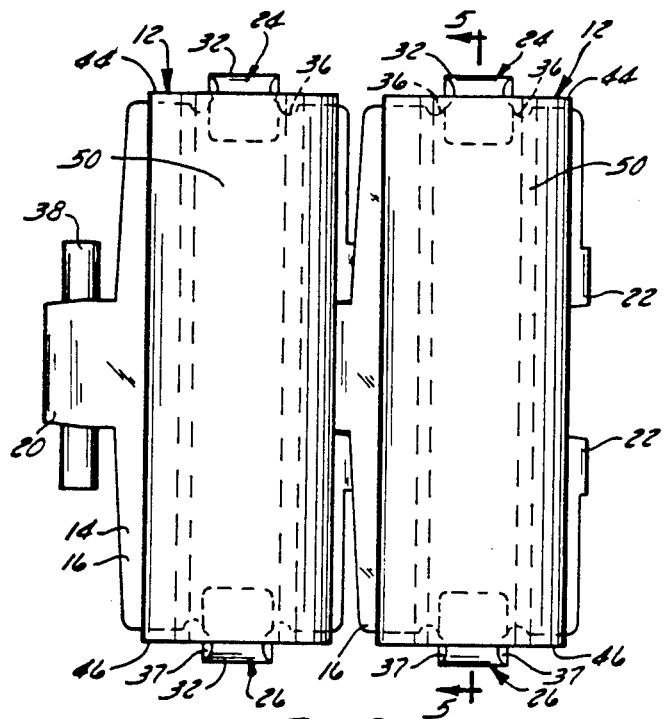
FIG. 2 is a top view of a chain made up of links identical to that shown in FIG. 1.

The chain link of the present invention is made up of a base link 10 and a resilient attachment 12. The base link 10 includes a flat base portion 14, which has a front surface 16, a back surface 18, forward and rear hinge eyes 20, 22 respectively from its leading and trailing edges, and first and second opposed retaining lips 24, 26, which are integral with the flat base portion 14 and project from its first and second ends, respectively. Guide shoes 28, 30 are attached to the back surface 18 of the flat base portion 14, by any known method, such as by resistance welding.

Figure 9:
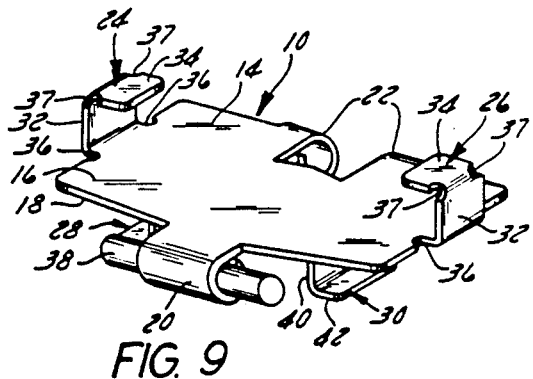
FIG. 9 is a perspective view of one of the links of the chain shown in FIG. 6.
Figure 11:
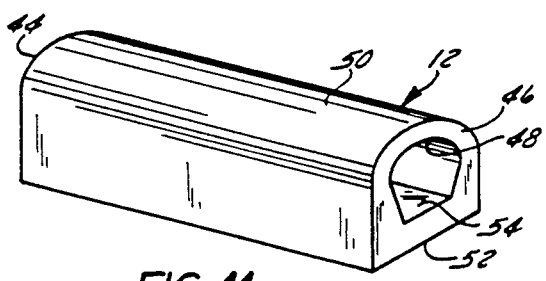
FIG. 11 is a perspective view of the resilient attachment which was shown on the link in FIG. 1.
Figure 10:
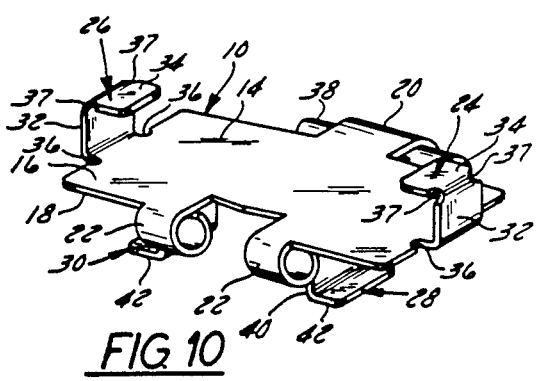
FIG. 10 is a perspective view of one of the links of the chain shown in FIG. 6.

Looking particularly at FIG. 9, it can be seen that each of the opposed retaining lips 24, 26 includes a first portion 32, which is substantially perpendicular to the flat base portion 14 and a second portion 34 which is substantially parallel to the flat base portion 14 and projects inward opposite the front surface 16 of the flat base portion 14. There are rounded indentations 36 on the flat base portion 14 where it intersects the opposed retaining lips 24, 26, and there are rounded indentations 37 on the forward and rear edges of the opposed retaining lips 24, 26, where the first portion 32 intersects the second portion 34. The rounded indentations 37 provide a smooth surface for contacting the resilient attachment 12 to avoid cutting that attachment. These rounded indentations 36, 37 also reduce stress concentration and permit the manufacturer to make sharp bends without tearing the material.

It should be noted that the hinge eyes 20, 22 do not project in the direction of the front surface 16 of the flat base portion 14 but instead leave that top surface 16 entirely flat except for the opposed lips 24, 26, which extend to a position opposite that surface. FIGS. 2, 3, 4, 6 and 7 show how the hinge eyes 20, 22 of adjoining links mesh with each other, permitting the links 10 to be connected by a pin 38 which is driven into the eyes 22 with an interference fit and which has a loose fit in the center eye 20, permitting the links 10 to side flex relative to each other for elevating or lowering articles from one level to another in the conveyor system.

Figure 5:
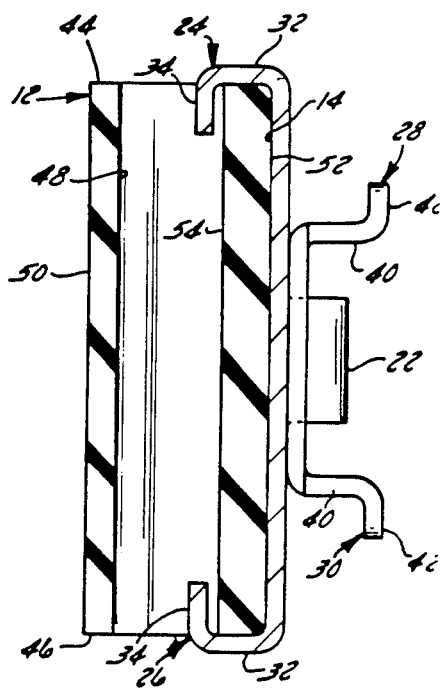
FIG. 5 is a sectional view of the link taken along the section 5—5 of FIG. 2.
Figure 8:
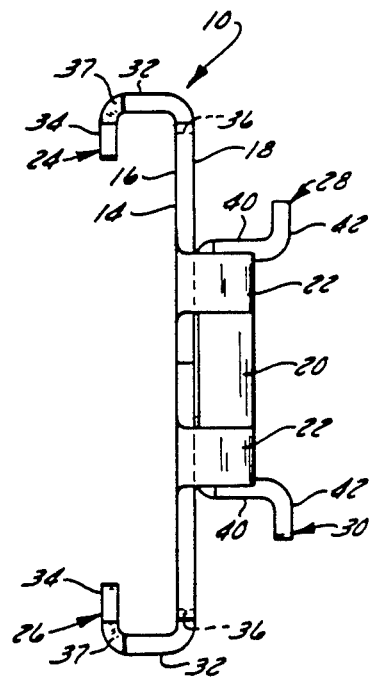
FIG. 8 is an end view of one of the links of the chain shown in FIG. 6.
Figure 7:
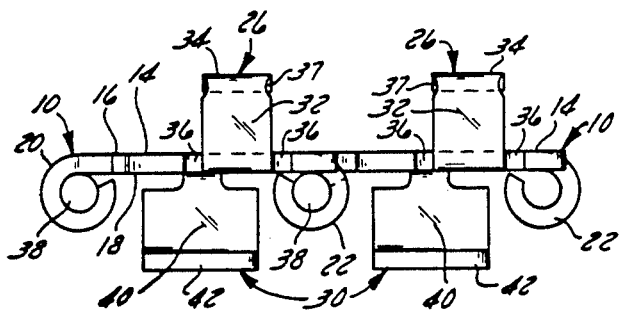
FIG. 7 is a side view of the chain shown in FIG. 6.

The general concept of guide shoes is detailed in U.S. Pat. No. 3,513,964, which is hereby incorporated by reference. It can be seen clearly in FIG. 8 that the guide shoes 28, 30 include a first portion 40, which is substantially perpendicular to the flat base portion 14, and a second portion 42, which is substantially parallel to the flat base portion 14, and which extends outward from the back surface 18 of the flat base portion. In a product capturing elevator, such as that shown in FIG. 12, the chains run in the position shown in FIGS. 2, 5, and 8, with the chain standing on the end. In this position, the lower guide shoe 30 rides on a track or rail, with the first portion 40 of that guide shoe 30 supporting the weight of the chain on the rail as the chain is driven by sprockets (not shown). The upper guide shoe 28 also fits over a track or rail, with the second portion 42 of that guide shoe 28 serving to maintain the link 10 in a vertical position.

Figure 12:
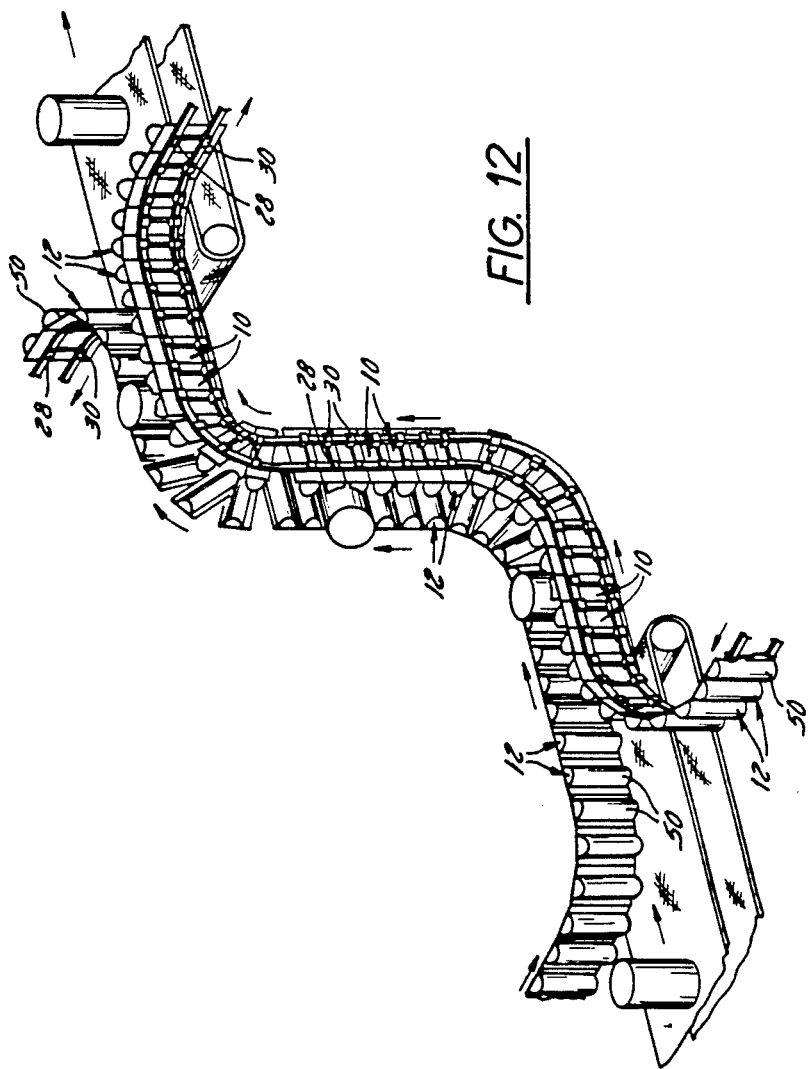
FIG. 12 is a schematic drawing of a conveyor system which uses the chain of FIGS. 1 through 11 to elevate articles from one level to another in the system.

The resilient attachment 12 may be more specifically referred to as a resilient, hollow, tubular gripping member, the function of which is to grip the articles to be carried by the product capturing conveyor as shown in FIG. 12. It may be made of any suitable resilient material, particularly of a urethane, rubber, or other suitable material. This gripping member 12 is approximately the same length as the flat base portion 14 of the base link 10, and it is retained on the link by means of the opposed retaining lips 24, 26. The gripping member 12 has first and second ends 44, 46 and inner and outer surfaces 48, 50. The outer surface 50 of the gripping member 12 includes a flattened outer surface portion 52, which lies against the front surface 16 of the flat base portion 14. The remainder of the outer surface 50 may have a number of different shapes, depending on the articles to be conveyed. Many shapes of gripping members are already known in the art. In this embodiment, the remainder of the outer surface 50 is semi-circular in shape; however, lengthwise ribs and various other shapes are also contemplated by this invention. The inner surface 48 of the attachment 12 also has a flattened surface 54, which is opposite the flattened outer surface portion 52. This flattened inner surface portion 54 has a width which is approximately the same width as the opposed retaining lips 24, 26, so that the lips contact this flattened inner surface portion 54 for retaining the attachment 12 on the flat base portion 14.

The retaining lips 24, 26 are centrally located on the link and occupy approximately one-third of the width of the link. This arrangement of the retaining lips is thought to provide the best retention while still leaving sufficient thickness to the resilient attachment so that it can function effectively. The retaining lips 24, 26 wrap around their respective ends 44, 46 of the tubular attachment and project inside the hollow portion of that attachment to retain it on the link.

The mixing for making and assembling the link 10 and attachment 12 are as follows: First, a flat base member is stamped from a sheet of metal, including projections for the hinge eyes 20, 22 and the lips 24, 26, and including the rounded indentations 36, 37. Next, the hinge eyes are bent in the direction of the back of the flat base member, and the retaining lips are bent in the direction of the front of the flat base member, and formed into their final shape. Next, the guide shoes 28, 30 are attached to the back of the link 10. Next, the resilient gripping member 12 is installed on the base link 10 by fitting one of the retaining lips 24 or 26 around the end of and into the hollow portion of the gripping member 12; then the resilient member 12 is flexed so as to fit the other of the retaining lips 26 or 24 around its respective end of the gripping member 12; and then the gripping member is released, so that it rests on the flat base 14 and is retained by the lips 24, 26. The method for installing the resilient attachment may be reversed in the field for removing a damaged attachment, and a new attachment may then be installed as described above.

Figure 14:
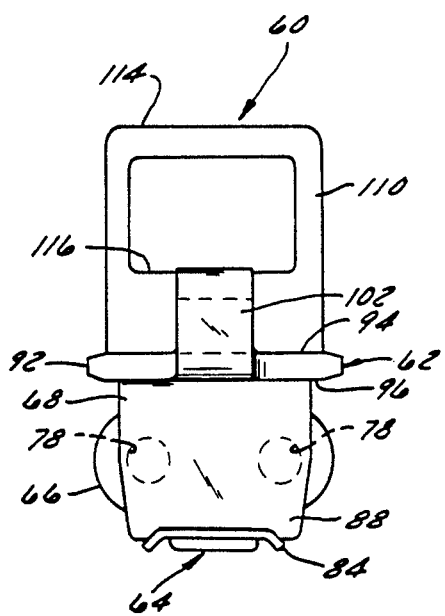
FIG. 14 is an end view of the chain link illustrated in FIG. 13.
Figure 13:
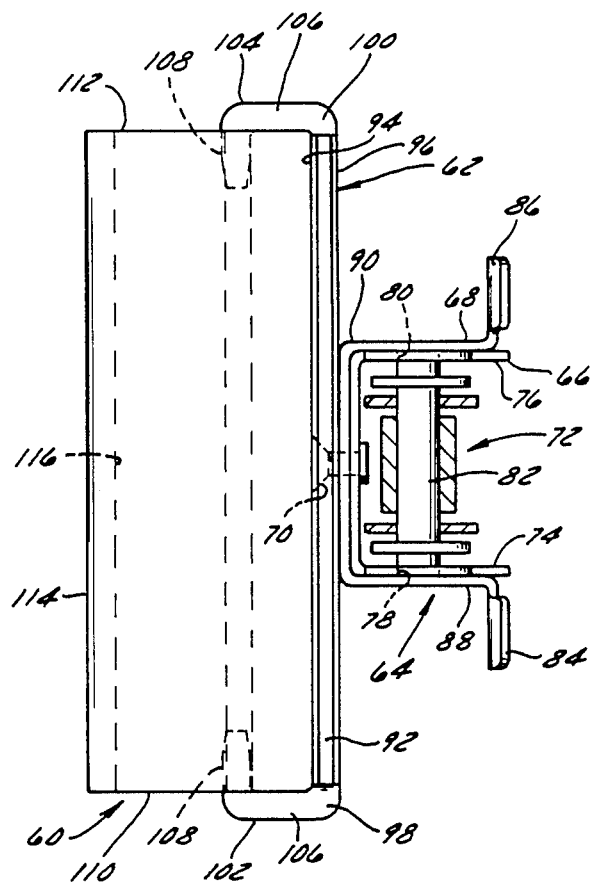
FIG. 13 is an end view of an alternate embodiment of the chain link of the invention.

An alternative embodiment of the chain link of the invention is shown in FIGS. 13 and 14 as including a resilient gripping member 60, plate means 62 on which the gripping member 60 is mounted, saddle means 64 mounted on a chain 72 and including an inner channel 66 and an outer channel 68 connected together and affixed to the plate means 62. The plate means 62 and saddle means 64 may be of either a metal or plastic material and may be either integral or connected together by a rivet 70 as shown in FIG. 13. The inner channel 66 of the saddle means 64 includes a pair of upstanding legs 74, 76 respectively having openings 78 and 80 which fit on the ends of a pin 82 comprising part of the chain 72 to thereby mount the link on the chain 72. The saddle means 64 may be removably snapped on the pin 82 and, where this type of mounting is desired, the saddle means 64 preferably comprises a flexible material. The outer channel 68 includes a pair of flanges or guide shoes 84 and 86 and a pair of upstanding legs 88 and 90 which bear against the legs 74 and 76 and close the openings 78 and 80 to thereby laterally position the link on the pin 82. It may be noted that the saddle means 64 and the portion of the plate means 62 attached to the saddle means 64 may be similar to the snap-on plate assembly disclosed in U.S. Pat. No. 4,096,943.

The plate means 62 includes a flat portion 92 having a front surface 94 and a back surface 96 to which the means 64 is affixed, and first and second lateral ends 98 and 100. First and second opposed retaining lips 102 and 104 project respectively from the first and second ends of the plate means. Each of the opposed retaining lips 102, 104 includes a first portion 106 extending away from the flat portion 92 of the plate means 62 and a second portion 108 extending into the resilient gripping means 60. The first portion 106 may extend perpendicularly relative to the flat portion 92 and the second portion 108 preferably extends substantially parallel to the flat portion 92 of the plate means 62.

Figure 3:
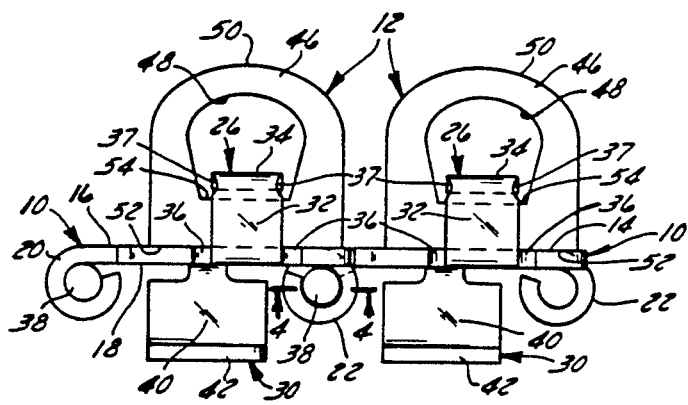
FIG. 3 is a side view of the chain shown in FIG. 2.
Figure 4:
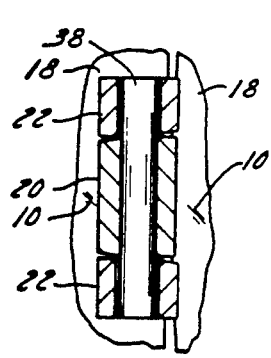
FIG. 4 is a broken away sectional view of the joint between two links, taken along the section 4—4 of FIG. 3.
Figure 1:
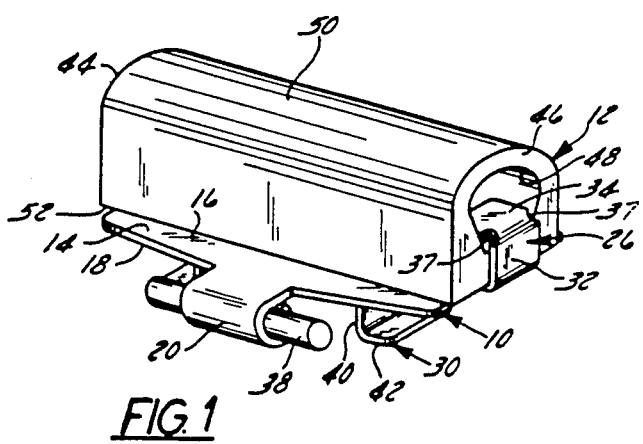
FIG. 1 is a perspective view of a chain link made in accordance with the present invention.
Figure 6:
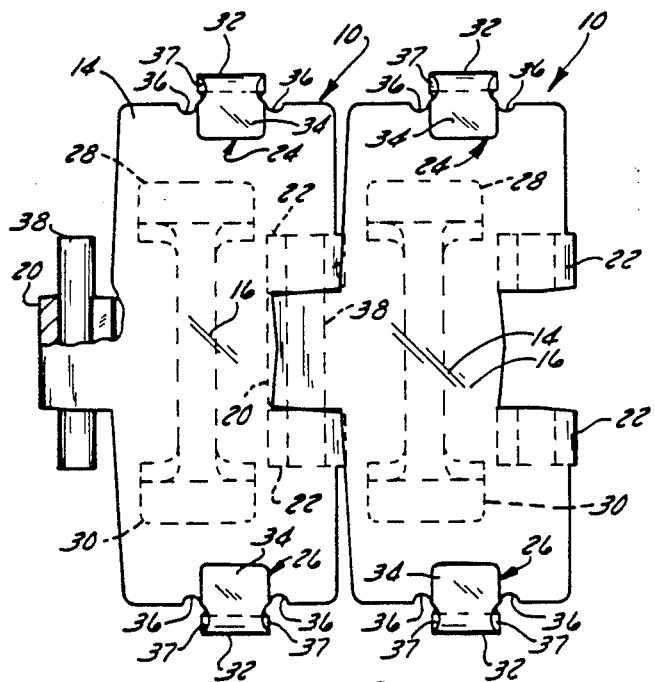
FIG. 6 is a top view of the chain shown in FIG. 2, with the resilient attachments removed.

The resilient gripping means 60 may be hollow and, like the resilient attachment 12 illustrated in FIGS. 1–3, functions in cooperation with adjacent resilient gripping means 60 to grip articles to be carried by the conveying chain. The resilient gripping means 60 may also be made of suitable resilient material such as urethane or rubber. The gripping means 60 is retained on the plate means 62 by the retaining lips 102, 104 and may be of the same lateral length as the plate means 62. The gripping means 60 has first and second lateral ends 110, 112 and inner and outer surfaces 114, 116. A portion of the outer surface 114 of gripping means 60 engages the front surface 94 of the flat portion 92 of plate means 62. Like the resilient attachment 12, the gripping means 60 may have a variety of suitable shapes.

While the aforedescribed chain and chain link are the preferred embodiment of the invention, it will be understood by those skilled in the art that many modifications may be made to that embodiment without departing from the scope of the present invention.

What is claimed is:

1. A carrying member for a product capturing chain having a chain link, said carrying member comprising:
    a plate having first and second surfaces and first and second lateral ends;
    means projecting from the second surface of the plate for attaching the carrying member to the chain;

a hollow, tubular resilient gripping member including first and second ends respectively having therein first and second openings, said gripping member being hollow along the entire length of said gripping member and being positioned against the first surface of the plate with said first and second openings respectively adjacent the first and second lateral ends of the plate; and retaining means extending from the plate and having first and second lips respectively projecting into the first and second openings for holding the gripping member immobilized against the plate.

2. The chain link member as recited in claim 1 wherein:
the gripping member has a flat portion against the plate; and
the retaining means holds the flat portion immobilized against the plate.

3. The chain link as recited in claim 1 wherein:
the gripping member includes a wall portion against the plate; and
the retaining means holds the wall portion immobilized against the plate.

4. The chain link as recited in claim 1 wherein the plate means has a removable snap-connection to the chain.

* * * * *

UNITED STATES PATENT AND TRADEMARK OFFICE
CERTIFICATE OF CORRECTION

PATENT NO. : 4,809,846
DATED : March 7, 1989
INVENTOR(S) : Wasyly G. Hodlewsky et al.

It is certified that error appears in the above-identified patent and that said Letters Patent is hereby corrected as shown below:

IN THE CLAIMS

Claim 4, Column 6, line 13, "snap-connection" should be --snap-on connection--.

Signed and Sealed this

Eighth Day of August, 1989

Attest:

DONALD J. QUIGG

Attesting Officer

Commissioner of Patents and Trademarks